United States Patent Office 3,529,334
Patented Sept. 22, 1970

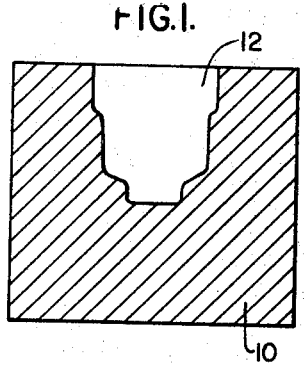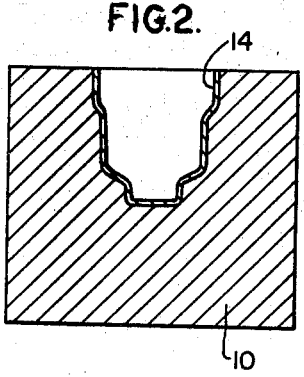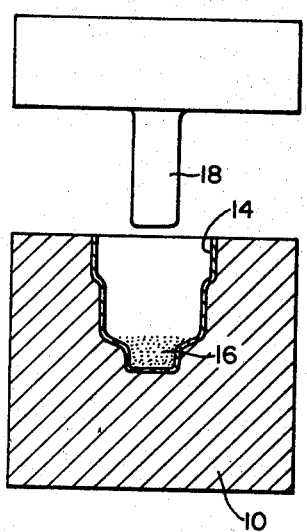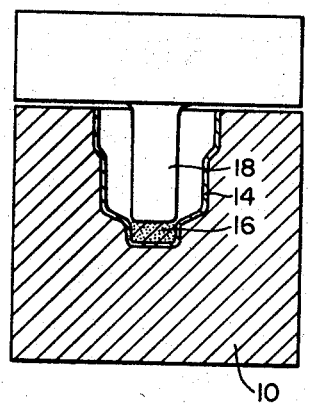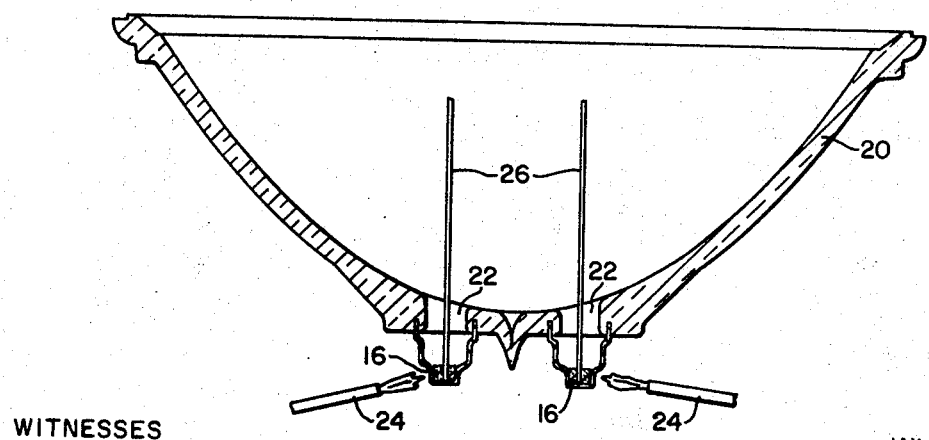

3,529,334
ASSEMBLING AND BRAZING METHOD
Isaac S. Goodman, Livingston, N.J., and Roy A. Nixon, Jr., Greenville, Ohio, assignors of one-half to Westinghouse Electric Corporation, Pittsburgh, Pa., a corporation of Pennsylvania, and one-half to Corning Glass Works, Corning, N.Y., a corporation of New York
Filed Aug. 11, 1967, Ser. No. 660,102
Int. Cl. H01j 9/32; B23k 37/06
U.S. Cl. 29—25.16      4 Claims

ABSTRACT OF THE DISCLOSURE

A method for brazing lead-in conductors to ferrules in sealed beam lamps which includes the steps of placing the lamp ferrule in a base mold form; filling a lower portion of the ferrule with a finally divided homogeneous brazing composition; and applying pressure to the powder by means of an upper rod shaped die member to compact the brazing composition within the lower portion of the ferrule. One or more of the ferrules are then sealed about openings in the reflector section of a sealed beam lamp and thereafter the compacted brazing composition melted to braze inserted lead-in conductors to the lower interior portion of each ferrule.

BACKGROUND OF THE INVENTION

This invention relates to brazing and more particularly to a method of brazing lead-in conductors to the ferrules or thimbles in sealed beam lamps.

In the past, in the manufacture of sealed beam lamps, the glass surrounding the openings at the base of the reflector portion of the lamp was softened and the relatively sharp annular edge of the ferrules forced into the softened glass to seal the ferrules about the openings or apertures in the reflector portion. A brazing pellet was then dropped into each ferrule and a lead-in conductor brazed to the interior surface of the ferrule. Several problems exist in the use of brazing pellets in the manufacture of sealed beam lamps. For example, in order to manufacture the pellet with high speed pressing equipment, the powder from which the pellet is pressed must include in addition to the brazing metals and a suitable flux, a binder and a lubricant. The lubricant is necessary to permit the pellet to be ejected from the pressing die and to prevent the die members from heating up and jamming due to expansion. The most suitable lubricant known in the prior art, compatible to any extent with the brazing process, are the stearates. However, pellets made with even ⅓ of 1%, by weight, of stearate in the composition required that the pellet be baked prior to use in order to eliminate, as much as possible, the carbon content of the stearate from the composition. Even with the baking process only about 50% of the carbon contained in the stearate additive brazing pellet could be liberated. The minute amount of carbon remaining in the processed brazing pellet, when employed in brazing lead wires to ferrules in sealed beam lamps, liberates sufficient carbon to provide an undesirable carbon residue on the interior surface of the aluminized reflector which ultimately reduces both the output and the life of the sealed beam lamp when the carbon attacks the lamp filament during operation of the lamp.

An additional problem exists when brazing pellets are used since the brazing pellets when dropped into the ferrule do not provide complete and continuous contact between the interior ferrule walls and the pellet. For this reason an increased amount of heat is necessary to insure complete melting of the brazing pellet during the brazing process. Even with the use of excessive temperatures in effecting the braze many brazes are incomplete and hence the lamp and all its parts must be relegated to the scrap pile.

SUMMARY OF THE INVENTION

It is accordingly an object of the present invention to provide an improved brazing process for brazing lead-in conductors to ferrules in sealed beam lamps.

Another object of the present invention is to provide a brazing process for brazing lead-in conductors to ferrules in sealed beam lamps in which the use of stearates in the brazing composition can be eliminated.

A further object of the present invention is to provide a method for brazing lead conductors to ferrules in sealed beam lamps wherein complete contact between the interior surface of the bottom portion of the ferrule and the brazing composition can be accomplished to facilitate a reduction in brazing temperature requirements.

A still further object of the present invention is to provide a brazing process for brazing lead conductors to ferrules in sealed beam lamps which will substantially reduce "lamp shrinkage" during manufacture.

The foregoing objects are accomplished in accordance with the present invention by providing a brazing method whereby separate pellet manufacturing is eliminated and the brazing material is formed as a compact in the bottom of a ferrule prior to the ferrule being sealed to the reflector and the brazing of the lead-in conductors or wires to the interior surface of the ferrules may be then accomplished simply and with an extra measure of assurance of completeness. More particularly, the process of the present invention includes; placing of a ferrule in a complementarily formed base or mold form; filling the bottom portion of the ferrule with a homogeneously mixed brazing composition in finely divided powder form; and compacting the powder form; and compacting the powder within the bottom portion of the ferrule by means of an upper pressing die, whereby upon sealing of the ferrule to the openings in the bottom of the reflector portion of a sealed beam lamp the brazing composition will be in intimate contact with the interior walls of the entire lower area of the ferrule and thus may readily and uniformly receive heat from the brazing torches to braze the lead-in conductors to the interior surface of the ferrules.

BRIEF DESCRIPTION OF THE DRAWINGS

The foregoing objects and others along with many of the attendant advantages of the present invention will become more readily apparent and better understood as the following detailed description is considered in connection with the accompanying drawings, in which:

FIG. 1 is a schematic sectional view of the lower mold form employed in practicing the present invention;

FIG. 2 is a schematic sectional view of the lower mold form with a thimble or ferrule in place;

FIG. 3 is a schematic sectional view similar to FIG. 2 with the finely divided homogeneously mixed brazing composition in the bottom of the ferrule;

FIG. 4 is a schematic sectional view similar to FIG. 3 illustrating the compacting step of the present invention;

FIG. 5 is a sectional view through a reflector section of a sealed beam lamp illustrating the brazing of the lead wire to the ferrules; and FIG. 6 is a flow diagram illustrating the steps employed in practicing the process of the present invention.

DESCRIPTION OF THE PREFERRED EMBODIMENT

As indicated previously, by employing the process of the present invention to braze lead-in conductors to ferrules in sealed beam lamps the stearates required as a lubricant in the manufacture of brazing pellets for brazing leads to ferrules can be eliminated from the brazing composition along with their deleterious carbon content. For example, suitable brazing compositions can be prepared from a wide variety of combinations of brass and bronze with an addition of about 5% by weight of a flux material, preferably borax. Additionally, a binder material for example silica in an amount of about 1% by weight may be employed if desired. With respect to the brass-bronze constituents, the brazing metal portion of the composition may be entirely brass or entirely bronze with the brass preferably being composed of from 55 to 80% copper and 20 to 45% zinc and the bronze composed of from 70 to 90% copper and from 10 to 30% tin. In the preferred composition, the brazing metal consists of from 40 to 60% brass and from 40 to 60% bronze which together comprises approximately 95% of the brazing composition.

Referring now in detail to the drawings, wherein like reference characters represent like parts throughout the several views, there is shown in FIGS. 1 through 4, in schematic illustration, the process for practicing the present invention. As illustrated in FIG. 1, a base mold form 10 having a cavity 12 therein exhibits an internal configuration which exactly complements the external configuration of a ferrule 14 which is inserted into the cavity as illustrated in FIG. 2. The lower portion of the ferrule 14 is then filled with the finely divided homogeneous brazing mixture in powder form as illustrated in FIG. 3. The brazing composition in finely divided powder form is then compacted by a pressing die 18 which enters the ferrule and compacts the finely divided powder into the lower portion thereof as illustrated in FIG. 4. The pressing die member is then removed from within the ferrule and the ferrule removed from the base member cavity with the brazing composition now in compacted form at the base of the ferrule. The base mold form 10 provides external support for the ferrule during the compacting step.

Illustrated in FIG. 5 is a reflector half or base of a sealed beam lamp generally designated 20 which has a plurality of apertures or openings 22 therethrough. The area of the glass around the apertures 22 is heat softened and the sharp ends of the ferrules 16 forced into the glass to seal the ferrules to the glass. At this point, brazing fires illustrated schematically at 24 heat the ferrules and melt the brazing composition into which filament support lead-in conductors 26 are inserted. The heating fires 24 are removed and the lead-in conductor to ferrule braze is complete.

As illustrated by the flow chart of FIG. 6, the method of brazing lead conductors to ferrules in sealed beam lamps in accordance with the present invention involves the steps of (1) inserting the ferrule into a base mold; (2) filling the lower portion of the ferrule with brazing alloy in finely divided powder form; (3) compacting the powder by application of a progressive compressive force; (4) sealing the ferrule to a reflector base in a sealed beam lamp and (5) brazing the lead-in conductors to the ferrules with the compacted brazing alloy.

As will be apparent from the foregoing, the process of the present invention eliminates the requirement for the use of a stearate in the brazing composition and hence eliminates the necessity of baking the brazing composition before its use in the brazing process. Furthermore, the final braze in the absence of a stearate constituent does not liberate carbon which will deposit on the lamp reflector and which will subsequently attack the lamp filament during operation of the lamp and shorten its life. It should be further noted that when a brazing pellet is employed complete contact between the pellet in the interior walls of the ferrule is not established and consequently even though higher brazing temperatures may be employed, incomplete melting sometimes occurs. With a brazing composition compacted within the ferrule itself as contemplated by the present invention, there is complete and intimate contact between the entire inner peripheral area of the lower portion of the ferrule and the adjacent brazing alloy thus permitting the braze to be uniform as well as accomplished at lower brazing temperatures.

Although this invention has been described with respect to the brazing of the lead conductors to ferrules in sealed beam lamps it will be apparent that in many situations where preformed brazing pellets are now employed, and some sort of receptacle is available in one of the parts to be brazed, that the compacting process of the present invention may be employed where it is desired to have a uniform, carbon free braze.

Since various changes may be made in the above-described invention without departing from the spirit thereof, it is intended that all matter contained in the foregoing description or shown in the accompanying drawings shall be interpreted as illustrative and not in a limiting sense.

We claim as our invention:

1. The method of brazing lead-in conductors to ferrules in sealed beam lamps, wherein each ferrule comprises a metallic member having a closed bottom portion and an open rim portion, which method comprises:
   filling the bottom portion of a ferrule with a brazing composition in finely divided form; thereafter
   applying the compressive force to said composition within said ferrule to form a compact; thereafter
   sealing the rim portion of said ferrule to the reflector portion of a sealed beam lamp; and thereafter
   heating the compacted brazing composition to a temperature sufficient to braze a lead-in conductor inserted therein to said ferrule.

2. The method according to claim 1 wherein said ferrule is externally supported during the application of said compressive force to said powder.

3. The method of brazing a wire member to the interior surface of a cavity defined by a thin walled metallic cup-shaped member comprising the steps of:
   filling a portion of said cavity with a brazing composition in finely divided form; thereafter
   applying a compressive force to said composition within said cavity to form a compact; thereafter
   sealing the rim of said cup-shaped member to an insulating portion of an electrical device; thereafter
   heating the exterior surface of said thin walled metallic member to liquefy said composition; thereafter
   inserting said wire member into said liquified composition; and
   permitting said liquified composition to cool to form a braze between the interior surface of said cavity and said wire member.

4. The method according to claim 3 wherein said thin walled metallic member is externally supported during the application of said compressive force to said composition.

References Cited

UNITED STATES PATENTS

| | | | |
|---|---|---|---|
| 1,706,880 | 3/1929 | Gustin | 29—25.13 |
| 1,922,162 | 8/1933 | King | 29—25.13 |

(Other references on following page)

UNITED STATES PATENTS

| | | | |
|---|---|---|---|
| 2,072,850 | 3/1937 | Andre | 29—24.15 X |
| 2,163,071 | 6/1939 | Stringer | 29—25.13 |
| 2,317,031 | 4/1943 | Cotman | 29—25.15 X |
| 2,445,035 | 7/1948 | Munger | 29—25.19 X |
| 2,764,799 | 10/1956 | McGowan | 29—25.19 |
| 3,097,621 | 7/1963 | Lalak | 29—25.19 X |
| 3,176,180 | 3/1965 | Affleck | 29—25.13 X |
| 3,111,746 | 11/1963 | Borg | 29—500 X |
| 3,332,140 | 7/1967 | Sugiura | 29—500 X |
| 3,408,719 | 11/1968 | Van Sickler | 29—25.15 X |
| 3,435,520 | 4/1969 | Copeland | 29—530 X |

WAYNE A. MORSE, Jr., Primary Examiner

U.S. Cl. X.R.

29—500, 530